United States Patent

[11] 3,614,153

| [72] | Inventors | Keith W. Tantlinger<br>Grosse Pointe Shores;<br>Adam D. Sweda, Grosse Pointe Farms, both of Mich. |
|---|---|---|
| [21] | Appl. No. | 829,811 |
| [22] | Filed | June 2, 1969 |
| [45] | Patented | Oct. 19, 1971 |
| [73] | Assignee | Fruehauf Corporation<br>Detroit, Mich. |

[54] UNIVERSAL TRAILER CHASSIS
9 Claims, 12 Drawing Figs.

[52] U.S. Cl. .................................................. 296/35 A,
105/366 A
[51] Int. Cl. .................................................. B62d 27/06
[50] Field of Search .......................................... 296/35 R,
35 A, 28 M; 105/366 A, 366 B, 366 C

[56] References Cited
UNITED STATES PATENTS

| 3,027,025 | 3/1962 | Tantlinger | 296/36 (.1) |
|---|---|---|---|
| 3,111,341 | 11/1963 | Fujioka et al. | 296/35 (.1) |
| 3,219,218 | 11/1965 | Hand | 296/35 (.1) |
| 3,259,400 | 7/1966 | Tantlinger et al. | 296/35 (.1) |

FOREIGN PATENTS

| 1,119,911 | 6/1956 | France | 105/368 |

*Primary Examiner*—Benjamin Hersh
*Assistant Examiner*—John A. Pekar
*Attorney*—Harness, Dickey and Pierce

ABSTRACT: The universal trailer chassis is so constructed as to be able to transport containers of the tunnel and standard types when secured thereon. The container rests upon the rear chassis frame bolster and abuts the front chassis frame bolster to which it is releasably secured.

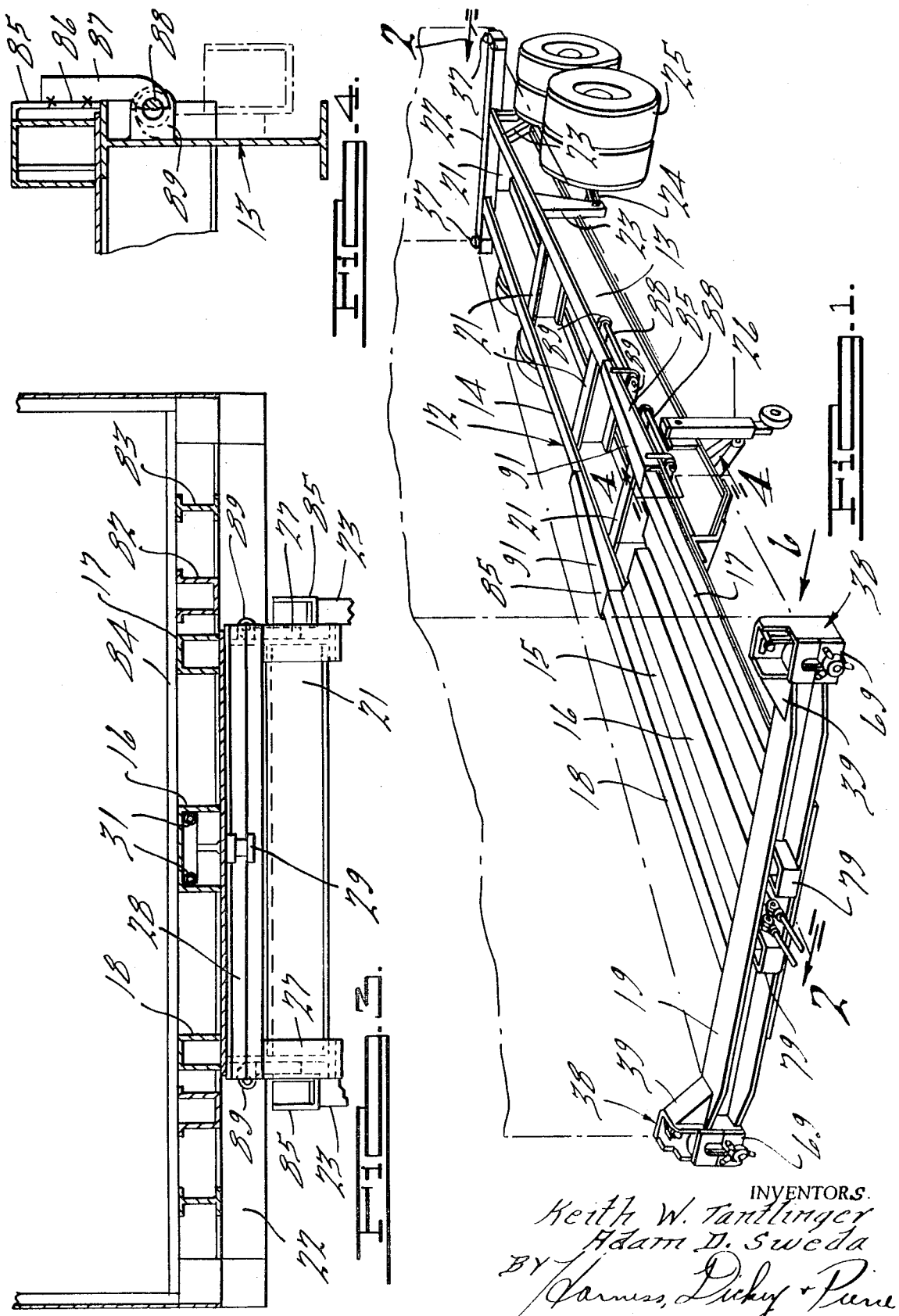

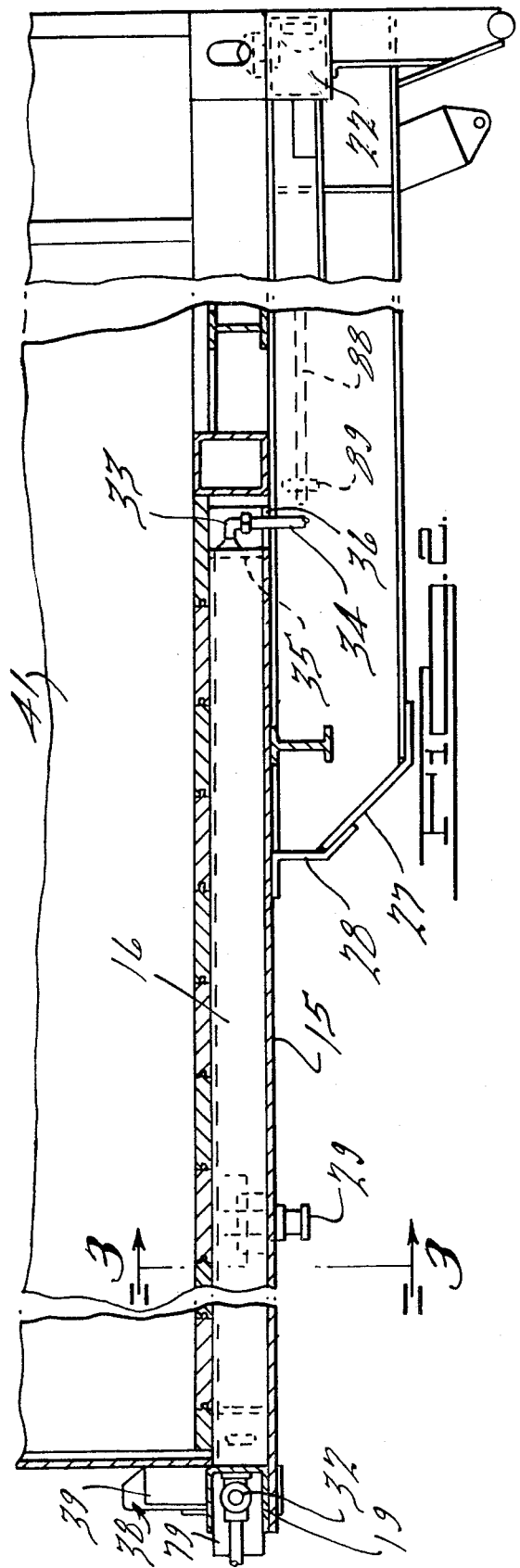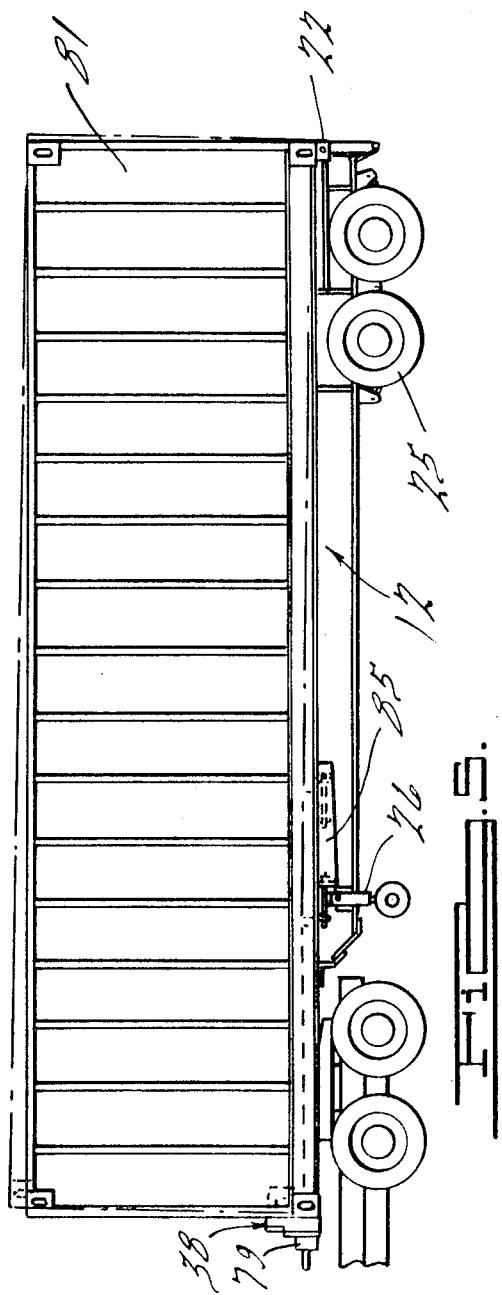

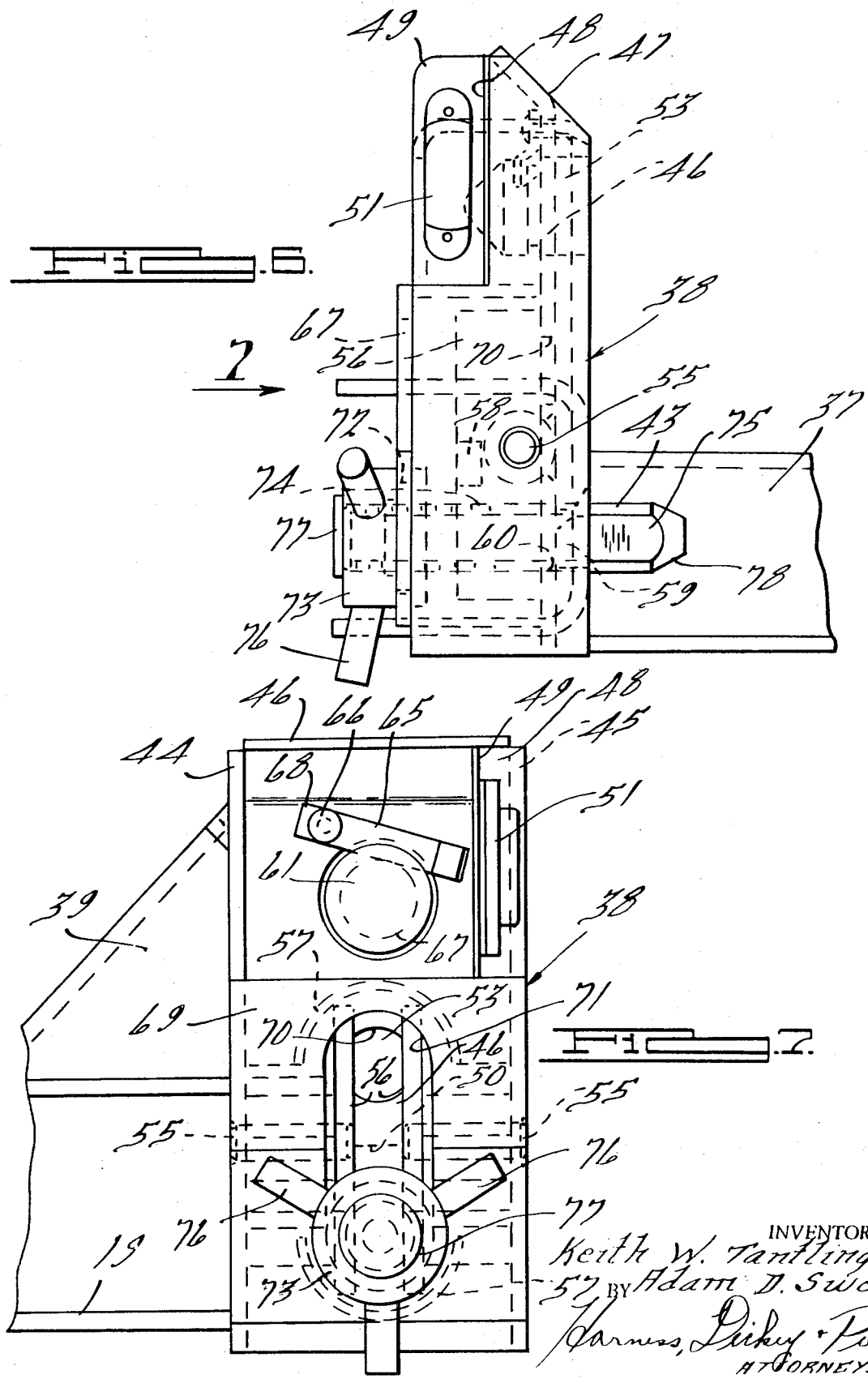

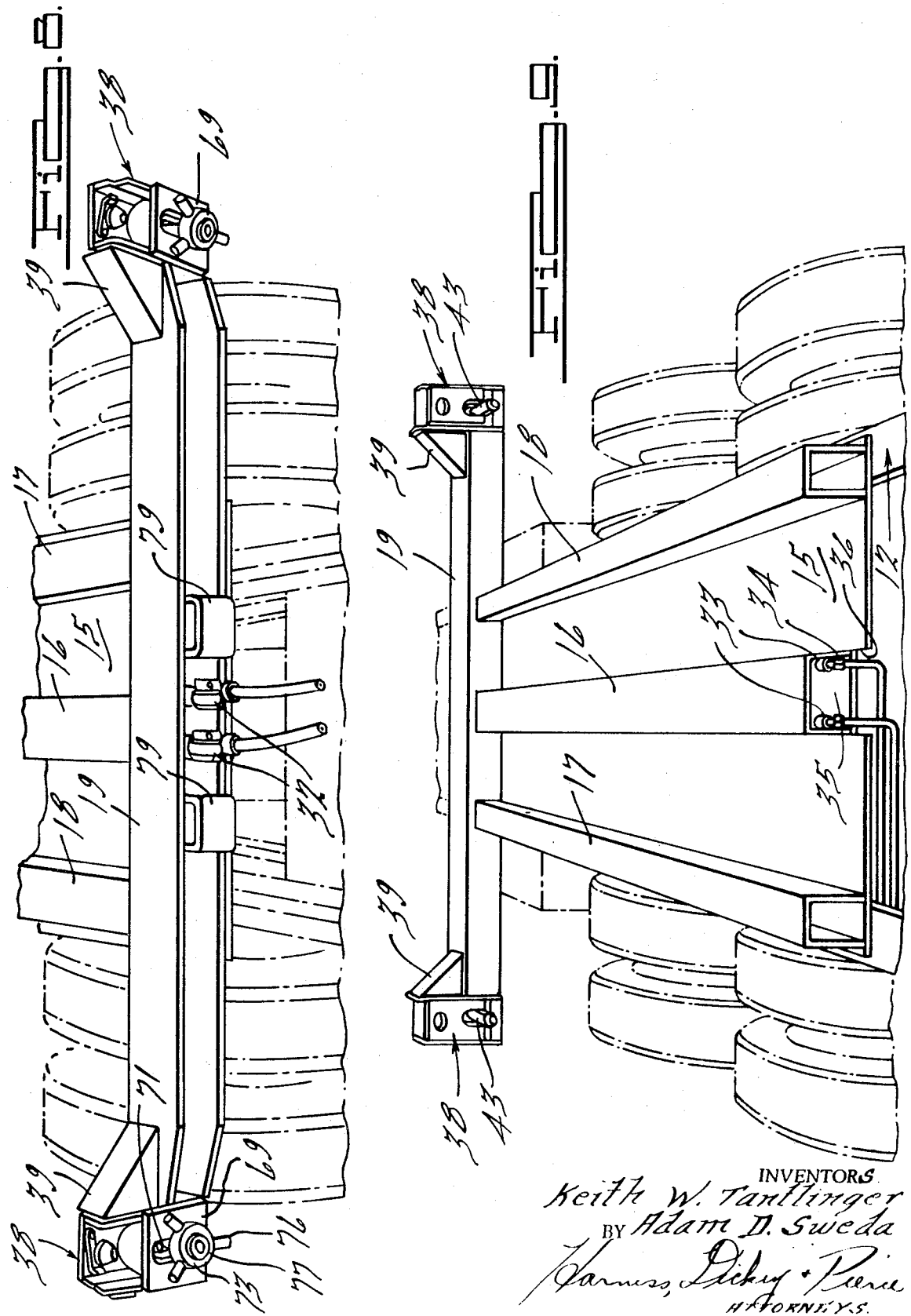

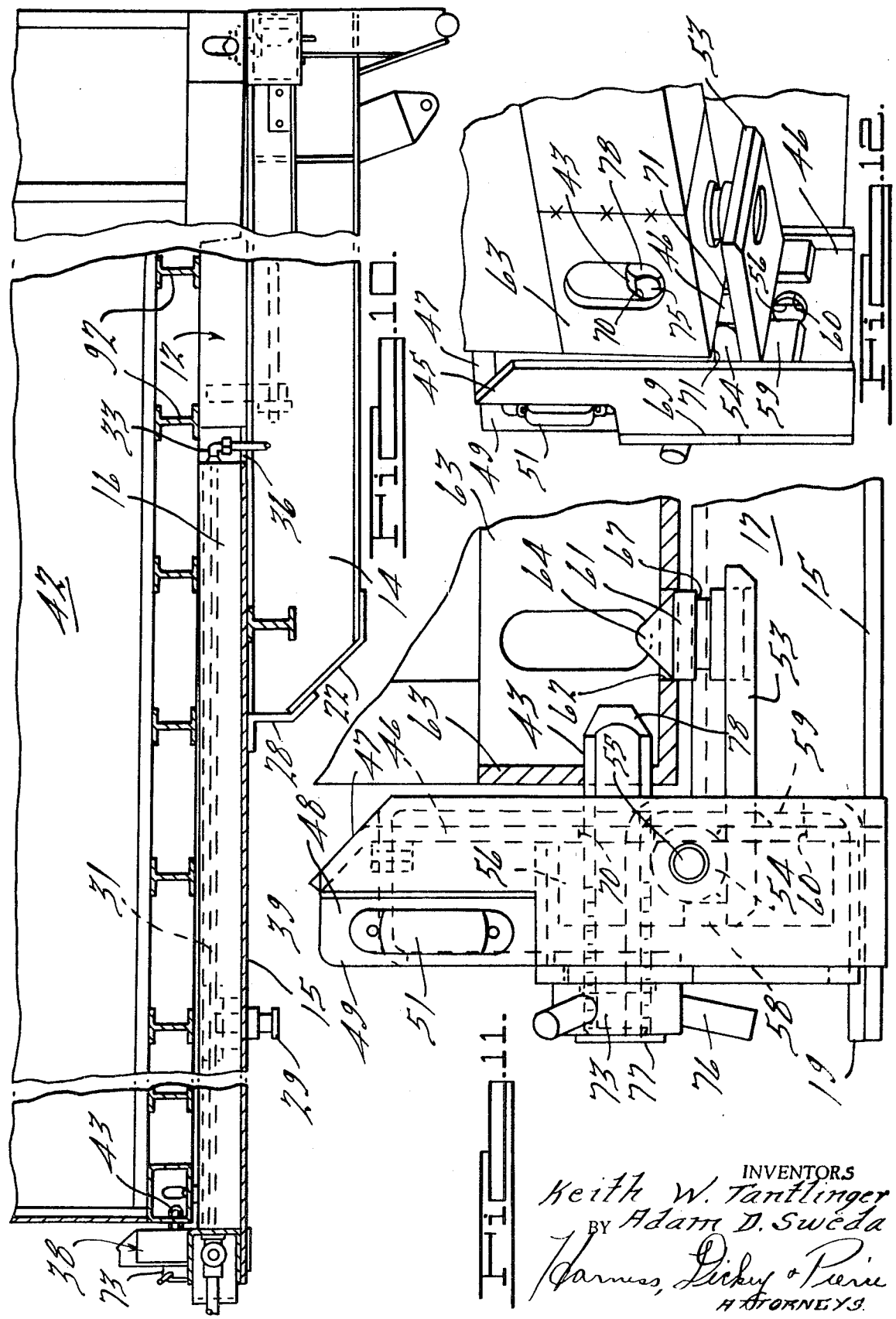

3,614,153

UNIVERSAL TRAILER CHASSIS

BACKGROUND OF THE INVENTION

No art was uncovered which showed the type of universal chassis frame of the present invention which is capable of releasably securing and transporting different types of containers employed in the trade at the present time.

SUMMARY OF THE INVENTION

The rear portion of the chassis frame has side rails of I-beam section joined by crossmembers. The front ends of the I-beams are joined to a plate on the top of which downwardly pressing spaced channel members are secured. A rear bolster of the standard type is secured to the ends of the I-beam having conventional twist locks at the ends in position to extend into apertures in the corner castings at the rear bottom corners of the container for securely locking the rear end of the container to the rear bolster. The bolster at the front end of the plate is a frontwardly presenting channel having its web welded thereto and to the inverted channel elements. Corner fittingS are welded to the ends of the front bolster against the rear face of which the front bottom corner castings of the container abut and are tied down by a horizontal pin in the end fittings which move into an aperture in the front face of the front corner castings. The pins are movable to two vertical positions, the lower position being employed for securing a tunnel-type container to the universal chassis frame, the upper position being utilized when a standard-type container is supported thereby. The fittings on the end of the front bolster have a rearwardly hingeable shelf containing a centering pin effective to center the front end of the standard container when lowered thereon when the shelves are in horizontal position. The tie down pins when in a raised position enter the front aperture in the corner castings of the standard container for locking the container to the shelves and bolster at the front end of the chassis frame.

In this arrangement, the standard container slightly slopes to the rear and reinforcing channel elements are moved from a stored position nested within the outer sides of the I-beam sections to a supporting position presenting downwardly on the top flange of the I-beams. The top web of the hinged channel elements slope on the angle at which the standard container is supported in position to engage a plurality of crossmembers in the bottom thereof to provide a central support for the standard container which is also supported at the ends thereof. It is to be understood that when the tunnel-type container is to be mounted on the chassis frame that the channel elements hinged thereon are moved into nested position within the outer recesses of the I-beams and that the shelves are moved to a vertical position nested within the end fittings.

BRIEF DESCRIPTION OF THE DRAWINGS

FIG. 1 is a perspective view of a universal trailer chassis frame embodying features of the present invention;

FIG. 2 is a sectional view of the structure illustrated in FIG. 1, taken on the line 2—2 thereof; with the landing gear omitted;

FIG. 3 is a sectional view of the structure illustrated in FIG. 2, taken on the line 3—3 thereof with the landing gear omitted FIG. 4 is an enlarged sectional view of the structure illustrated in FIG. 1, taken on the 4—4 thereof;

FIG. 5 is a side view of the trailer chassis illustrated on FIG. 1, with a tunnel-type container secured thereon;

FIG. 6 is an enlarged view of the fixture on the front corner of the chassis frame illustrated in FIG. 1, as viewed from the point 6 thereof;

FIG. 7 is a broken view of the structure illustrated in FIG. 6, as viewed from the point 7 thereof; bolster FIG. 8 is an enlarged view of the front end of the chassis frame illustrated in FIG. 1, showing the bolster construction thereof;

FIG. 9 is a perspective view of the front end of the chassis frame illustrated in FIG. 1, as viewed from the central portion thereof looking forwardly;

FIG. 10 is a view of the structure illustrated in FIG. 2, with a standard container mounted thereon;

FIG. 11 is an enlarged broken view of the left-hand corner of the structure illustrated in FIG. 10, and FIG. 12 is an outside corner view in perspective of the structure illustrated in FIG. 11.

DESCRIPTION OF THE PREFERRED EMBODIMENT

The universal chassis frame of the present invention is capable of supporting and transporting different types of containers, specifically a tunnel-type and a nontunnel type which may be of unit or coupled construction. These different types of containers are interchangeable on the chassis frame without extra equipment or optional hardware. The rear end of the container rests upon a bolster where it is locked down by twist locks while the front end of the container is located adjacent to the rear face of a front bolster the fixtures at the ends of which contain pins which are projectable into the front bottom corners of the container castings to tie down the front end of the container.

The chassis frame 12 has two I-beam sections 13 and 14 joined to a front plate 15 which has a central and two side inverted channel elements 16, 17 and 18 welded thereto. The front ends of the plate 15 and channel elements are welded to a front bolster 19 which is supported thereby.

The two I-beams 13 and 14 are interconnected by crossmembers 21 and a bolster 22 is secured to the rear ends of the I-beams 13 and 14. The I-beams 13 and 14 have members 23 attached thereto for engaging the ends of leaf springs 24 which support axles for the running wheels 25 in the conventional manner. Near the front end of the I-beams 13 and 14 a landing gear mechanism 26 of conventional construction, is secured for extension and retraction to and from the ground.

As illustrated in FIGS. 2 and 10, the forward end of the I-beams 13 and 14 have the lower flange and central web cut an angle and reinforced by a strip 27 which is interconnected by a cross plate 28 secured to the underface of the plate 15 and to the upper end of the strips 27. A king pin 29 is secured to the underface of the channel 16 and to the plate 15 from which it extends. A pair of air lines 31 pass within the tunnel formed by the channel section 16 and extend on opposite sides of the king pin 29 having fittings 32 at the front end and a pair of elbows 33 on a closure plate 35 at the rear end to which conductors 34 are connected for delivering air to the brakes of the running wheels 25. The elbows 33 and the connections to the conductors 34 are protected by a recess formed by having the tunnel 16 of shorter length than the side channels 17 and 18 and by a notch 36 in the plate 15.

The outer ends of the rear bolster 22 carries a twist lock 37 of conventional form, the one herein illustrated having a conical head with both sides cut away to form parallel surfaces to pass through a rectangular slot in the bottom of a corner casting of the container. The head extends transversely across the slot in locked position when the twist lock is rotated 90°. The front bolster 19 has a fitting in the nature of a housing 38 secured at each end and reinforced by channel gussets 39. The front face of a container has its bottom front corner castings substantially abutting the rear face of each of the housings 38 on the ends of the front bolster when secured to the chassis frame 12.

The housing 38 is made of two sideplates 44 and 45 connected on the rear end by a plate 46 which slopes inwardly at 47 at the top. A cutout corner 48 in the plate 45 forms a recess when closed by an angle member 49 to which a light fixture 51 is secured and protected by being located within the recess. A shelf 53 has a central cutout section 50 above which a pair of spaced cylindrical sleeves 54 are welded and pivotedly secured on pins 55 the outer ends of which are supported in apertures in the sideplates 44 and 45 to which they are tack welded. The inner ends of the pins 55 extend into apertures in a pair of spaced plates 56 secured to the plate 46 and to a pair of semicylindrical reinforcing plates 57 also welded to the plate 46. The portions of the plate 46 below the pins and outwardly of the plates 56 are notched at 71 to receive the spaced ends of the shelf 53. When in horizontal position as illustrated in FIG. 11, the spaced forwardly directed ends of the plate 53 extend through the notches 71 in the plate 46 and engage a pair of stop plates 58 with the portion facing rearwardly of the cylindrical sleeve 54 resting upon a pair of stop blocks 59. This rigidly supports the shelf 53 when in horizontal position without applying any strain to the sleeve 54 or pins 55. When the shelf 53 is in raised position as illustrated in FIG. 6, a recess is provided between the rear ends of the sideplates 44 and 45 and the plates 46 to have the shelf nested therein. The end of the shelf has a tapered pin 61 secured thereto for centering the container through the engagement of the bottom apertures 62 in the front corner castings 63 of a standard-type container with a conical end 64 of the pins 61.

The conical end 64 is also useful for raising a latch arm 65 secured by a pivot 66 to the front face of the plate 46 for automatically securing the shelf in raised position when the latch arm 65 drops into an annular slot 67 provided in the pin 61 below the conical end 64 thereof. A protruding rear end 68 of the latch arm 65 abuts the sloping portion 47 of the plate 46 and prevents the arm from dropping below center so that it will be raised by the conical end 64 when the shelf is raised to vertical position. A two-part plate 69 is welded to the lower portion of the sideplates 44 and 45 having a vertical central slot 71 therein. The vertical edges of the slot 71 extend within an annular slot 72 of a nut 73 of cylindrical form having a thread 74 on the outer portion of a central aperture therethrough.

A tiedown pin 43 has an exterior thread 74 on the portion extending through the threaded nut 73, the extending end being unthreaded. The pin has parallel surfaces 75 on opposite sides which are received between the plates 56 to retain the pin from turning when the nut 73 is rotated by the manual engagement of three fingers 76 projecting therefrom. The forward end of the pin 43 has a washer or disc 77 welded or otherwise secured thereto to limit the movement of the pin 43 from the rear of the housing 38. The extending end of the tiedown pin 43 has a truncated conical head 78 which further centers the corner castings at the front end of the container when the front end of the container is being tied down to the chassis frame, as illustrated in FIG. 11. The housings 38 are attached to the ends of the bolster 19 by welding the sideplate 44 thereto and reinforced by the channel gussets 39 which are welded to the plate 44 and to the bolster 19. It will be noted in FIG. 8 that bumper elements 79 are provided on the front of the bolster to protect the bolster when a tractor is backing thereunder and for protecting the fittings 32 on the air lines 31 or an electrical receptacle if the tunnel 16 is to be employed to carry the electric conductors. The air lines are shown by way of example, and it is to be understood that either the electric conductors, the air lines or both, may be carried by the central channel elements 16.

When a tunnel-type container 81, as illustrated in FIGS. 2, 3 and 5 is to be carried by the chassis frame 12, longitudinally extending bottom channel elements 82 and I-beams 83 at the front thereof are located outwardly of the channel members 17 and 18 of the chassis frame. A forward bottom plate 84 of the container rests directly upon the top of the channel elements 16, 17 and 18. In this arrangement the shelves 53 in the housings 38 are locked in vertical position and the front end of the container is located by the rear twist locks 37 directly adjacent to the housings 38 at the ends of the front bolster 19. The tiedown pins 43 are advanced by the turning of the nut 73 to have the truncated end 78 pass through an aperture 60 in the plate 46 into an aperture in the bottom front corner castings 63 of the container. When the pins 43 are fully extended, the washers 77 abut the nuts and the front end of the container is tied down to the chassis frame with the nuts locked in position against the two-part plate 69 and the washer 77. With this arrangement the top and bottom of the channel-type container is parallel to the top surface of the chassis frame 12 and securely attached thereto.

When a standard-type container, one not having the forward channel elements 82 and I-beams 83 on the bottom, is to be transported on the chassis frame 12, a pair of channel sections 85 are utilized. The channel sections are pivoted to the sides of the I-beams 13 and 14 from which they are swung to a position to rest upon the top flange of the I-beams in alignment with the side channel elements 17 and 18, as illustrated in FIGS. 1 and 4. The channel sections 85 have outer side flanges thereof secured to a pair of arms 87 having an aperture at the free end which receive rods 88 which are secured to spaced brackets 89 welded to the central web of the I-beam. As illustrated in FIG. 1, the two rods 88 are supported by the spaced brackets 89 in aligned spaced relation to permit the channel sections 85 not only to be swung outwardly from the top web of the I-beam 13 but also to be moved to the rear to avoid the landing gear 26 which, in the embodiment illustrated, interferes with the swinging movement of the channel sections. As illustrated in FIG. 4, the arms 87 of the channel sections 85 rest against the outer faces of the I-beams 13 and 14 in stored position and this will occur without the necessity of moving the channel sections 85 rearwardly when the landing gear 26 is located forwardly of the position illustrated. It will be noted that the web of the channel sections 85, when resting upon the I-beams, have a slight slope rearwardly to form a support for crossmembers on the bottom of the standard containers. The degree of this slope is small as would be evidenced by the position of the tiedown pin 43 in an upper aperture 70 in the plate 46 and the length of the container from the rear end which is locked onto the rear bolster 22. This slope is illustrated somewhat exaggerated in dot and dash line in FIG. 5. When supporting this type of container, the shelf 53 is moved to horizontal position as illustrated in FIGS. 11 and 12. It will be noted in FIG. 10 that cross members 92 located at the forward central section of the container, rest upon webs 91 of the channel sections 85 to thereby support the central portion of the container. The front end of the container rests upon the shelves 53 while the rear end thereof rests upon the rear bolster 22.

It will be noted that the pins 43 will be retracted to have the tapered end 78 located forwardly of the plate 46 so that the pins can be moved vertically to a position of alignment with either aperture 60 or 70. When tying down the front end of the container, the pins will be in shear within either aperture 60 or 70 which are located directly opposite to the castings in the front bottom corners of the container.

We claim:

1. In a chassis construction, a frame, fixed bolsters at the front and at the rear of the frame, vertically extending securing means for a container at the ends of the rear bolster, housing means located at the ends of the front bolster, each having a rearwardly disposed plate containing an upper and lower aperture, horizontally extending pin means projectable through either the upper or lower aperture to extend rearwardly of said plate, said frame having side rails which terminate short of the front end thereof, a plate secured to the front end of the rails to which the front bolster is attached, and supporting means on said plate disposed parallel to said side rails in position for engagement by the front bottom portion of a container of the channel type.

2. In a chassis construction as recited in claim 1, wherein the supporting members are inverted channel elements one being disposed on the center of the plate and the outer one being aligned with the rails.

3. In a chassis construction as recited in claim 2, wherein fluid conduits, electrical conductors or both extend through one of said channel elements.

4. In a chassis construction as recited in claim 1, wherein structural members are pivoted to said rails for movement from a position on the top thereof to a position at the side thereof, the top of said structural members sloping rearwardly for supporting intermediate crossmembers on a container with the crossmembers forwardly thereof disposed above and supporting members.

5. In a chassis construction as recited in claim 4, wherein the slope of the structural members substantially falls on the slope of the container when its front crossmembers are located above the supporting members and its rear end rests on the rear bolster.

6. In a chassis construction as recited in claim 1, wherein said housing means having a vertical passageway therein in which the horizontally extending pin means is vertically shiftable from a bottom position aligned with the lower aperture to an upward position aligned with said upper aperture.

7. In a chassis construction as recited in claim 6, wherein a nut is mounted for rotation in said housing and for vertical movement adjacent to said passageway, said pin having a section of thread thereon engaged by the thread of the nut and having flat sides which engage the sides of the passageway and prevent it from turning when the nut is rotated for advancing or retracting the pin.

8. In a chassis construction as recited in claim 7, wherein a pivoted shelf is mounted within the housing for movement to a horizontal supporting position, a pin with a tapered head mounted on said shelf for locating the front bottom corners of a container when supported thereby in position to be tied down by said pin when in said upper aperture.

9. In a chassis construction as recited in claim 8, wherein said shelf is hinged to a vertical position recessed within the housing, and a latch on said housing actuated by the tapered head of the pin for locking the shelf in vertical position.